US012095171B2

United States Patent
Khalil et al.

(10) Patent No.: US 12,095,171 B2
(45) Date of Patent: Sep. 17, 2024

(54) ANTENNA ARRAY CALIBRATION SYSTEMS AND METHODS

(71) Applicant: Analog Devices International Unlimited Company, Limerick (IE)

(72) Inventors: Ahmed I. Khalil, Dracut, MA (US); Mohamed A. Abdelsalam, Giza (EG)

(73) Assignee: Analog Devices International Unlimited Company, Limerick (IE)

(*) Notice: Subject to any disclaimer, the term of this patent is extended or adjusted under 35 U.S.C. 154(b) by 0 days.

(21) Appl. No.: 18/303,321

(22) Filed: Apr. 19, 2023

(65) Prior Publication Data

US 2023/0261373 A1 Aug. 17, 2023

Related U.S. Application Data

(63) Continuation of application No. 15/611,289, filed on Jun. 1, 2017, now abandoned.
(Continued)

(51) Int. Cl.
*H01Q 3/26* (2006.01)
*H01Q 3/34* (2006.01)
(Continued)

(52) U.S. Cl.
CPC .............. *H01Q 3/267* (2013.01); *H01Q 3/34* (2013.01); *H01Q 21/22* (2013.01); *H04B 5/73* (2024.01); *H04B 17/12* (2015.01); *H01Q 21/061* (2013.01)

(58) Field of Classification Search
CPC .......... H01Q 3/267; H01Q 3/34; H01Q 21/22; H01Q 21/061; H04B 5/0043; H04B 17/12
See application file for complete search history.

(56) References Cited

U.S. PATENT DOCUMENTS 4,348,676 A * 9/1982 Tom .................. G01S 3/325
342/369
4,864,315 A 9/1989 Mohuchy
(Continued)

FOREIGN PATENT DOCUMENTS

CN 101479885 A 7/2009
CN 101904051 A 12/2010
(Continued)

OTHER PUBLICATIONS

U.S. Appl. No. 15/904,045 including its prosecution history, including without limitation Office Actions, Amendments, Remarks and any potentially relevant documents, filed Feb. 23, 2018, Khalil et al.
(Continued)

*Primary Examiner* — Jinsong Hu
*Assistant Examiner* — Rui M Hu
(74) *Attorney, Agent, or Firm* — Knobbe, Martens, Olson & Bear, LLP

(57) ABSTRACT

Aspects of this disclosure relate to an array calibration system and method using probes disposed between antenna elements. In certain embodiments, the calibration is performed by measuring near-field relative phase and amplitude measurements of the antenna elements and using such relative measurements to adjust the amplitude and phase of the transceivers connected to the antenna elements. In some embodiments, each antenna element within a set of antenna elements transmits a signal that is received by a single probe, and the received signals are assessed to determine relative phase or amplitude measurements. In some embodiments, a single probe transmits a signal that is received by each antenna element within a set of antenna elements, and the received signals are assessed to determine relative phase and amplitude measurements.

20 Claims, 14 Drawing Sheets

Related U.S. Application Data

(60) Provisional application No. 62/380,328, filed on Aug. 26, 2016.

(51) Int. Cl.
  *H01Q 21/06* (2006.01)
  *H01Q 21/22* (2006.01)
  *H04B 5/73* (2024.01)
  *H04B 17/12* (2015.01)

(56) References Cited

U.S. PATENT DOCUMENTS

| | | | |
|---|---|---|---|
| 5,235,342 A * | 8/1993 | Orton | H01Q 21/22 343/703 |
| 5,412,414 A | 5/1995 | Ast et al. | |
| 5,530,449 A * | 6/1996 | Wachs | H01Q 3/267 342/372 |
| 5,581,517 A | 12/1996 | Gee et al. | |
| 5,657,023 A * | 8/1997 | Lewis | H01Q 3/267 342/174 |
| 5,682,165 A * | 10/1997 | Lewis | H01Q 3/267 342/372 |
| 5,861,843 A * | 1/1999 | Sorace | H01Q 3/28 342/174 |
| 5,864,317 A | 1/1999 | Boe et al. | |
| 5,864,543 A | 1/1999 | Hoole | |
| 6,104,935 A | 8/2000 | Smith | |
| 6,157,343 A * | 12/2000 | Andersson | H01Q 3/267 342/174 |
| 6,252,542 B1 | 6/2001 | Sikina et al. | |
| 6,356,233 B1 | 3/2002 | Miller et al. | |
| 7,068,218 B2 | 6/2006 | Gottl et al. | |
| 7,362,266 B2 | 4/2008 | Collinson | |
| 7,471,237 B2 | 12/2008 | Wooldridge | |
| 7,576,686 B2 | 8/2009 | Needham et al. | |
| 7,714,776 B2 | 5/2010 | Cooper et al. | |
| 7,904,117 B2 | 3/2011 | Doan et al. | |
| 7,911,376 B2 | 3/2011 | Hardacker et al. | |
| 8,004,456 B2 | 8/2011 | Scott | |
| 8,045,926 B2 | 10/2011 | Martikkala et al. | |
| 8,199,048 B1 | 6/2012 | Medina Sanchez | |
| 8,295,788 B2 | 10/2012 | Rofougaran et al. | |
| 8,559,571 B2 | 10/2013 | Tung et al. | |
| 8,593,337 B2 | 11/2013 | Ookawa | |
| 8,976,845 B2 | 3/2015 | O'Keefe et al. | |
| 9,035,858 B2 | 5/2015 | O'Keefe et al. | |
| 9,113,346 B2 | 8/2015 | Pivit et al. | |
| 9,319,904 B1 | 4/2016 | Srinavas et al. | |
| 9,331,751 B2 | 5/2016 | Sikina et al. | |
| 9,444,577 B1 | 9/2016 | Zhang et al. | |
| 9,628,256 B2 | 4/2017 | O'Keefe et al. | |
| 9,692,530 B2 | 6/2017 | O'Keefe et al. | |
| 9,705,611 B1 * | 7/2017 | West | H01Q 3/267 |
| 9,762,283 B2 | 9/2017 | Chen et al. | |
| 9,876,514 B1 | 1/2018 | Corman et al. | |
| 9,912,467 B2 | 3/2018 | Alpert et al. | |
| 10,128,894 B1 | 11/2018 | O'Brien et al. | |
| 10,211,527 B2 | 2/2019 | Safavi-Naeini et al. | |
| 10,263,650 B2 | 4/2019 | Corman et al. | |
| 10,305,564 B1 | 5/2019 | Stang et al. | |
| 10,469,183 B1 | 11/2019 | Kuo | |
| 11,177,567 B2 | 11/2021 | Khalil et al. | |
| 2001/0005685 A1 * | 6/2001 | Nishimori | H01Q 3/2605 455/562.1 |
| 2002/0089447 A1 | 7/2002 | Li | |
| 2002/0171583 A1 | 11/2002 | Purdy et al. | |
| 2004/0032365 A1 | 2/2004 | Gottl et al. | |
| 2004/0061644 A1 | 4/2004 | Lier et al. | |
| 2006/0192710 A1 * | 8/2006 | Schieblich | H04B 17/21 455/67.11 |
| 2006/0234694 A1 | 10/2006 | Kawasaki | |
| 2006/0273959 A1 | 12/2006 | Kawasaki | |
| 2008/0129613 A1 * | 6/2008 | Ermutlu | H01Q 3/267 343/703 |
| 2008/0153433 A1 * | 6/2008 | Pallonen | H04B 17/364 370/282 |
| 2008/0225174 A1 | 9/2008 | Greggain et al. | |
| 2009/0267824 A1 * | 10/2009 | Cooper | H01Q 3/267 342/174 |
| 2010/0093282 A1 * | 4/2010 | Martikkala | H04B 17/21 455/63.4 |
| 2010/0117890 A1 | 5/2010 | Vook et al. | |
| 2011/0006949 A1 | 1/2011 | Webb | |
| 2011/0134001 A1 * | 6/2011 | Sakata | G01R 29/105 343/703 |
| 2012/0027066 A1 | 2/2012 | O'Keeffe | |
| 2012/0146840 A1 | 6/2012 | Ookawa | |
| 2013/0016003 A1 * | 1/2013 | Stirling-Gallacher | H01Q 3/26 342/372 |
| 2013/0077708 A1 | 3/2013 | Sorrells et al. | |
| 2013/0234883 A1 | 9/2013 | Ma et al. | |
| 2014/0111373 A1 | 4/2014 | Puzella et al. | |
| 2014/0169509 A1 | 6/2014 | Tsofe | |
| 2014/0210668 A1 * | 7/2014 | Wang | H01Q 3/34 342/372 |
| 2015/0115978 A1 * | 4/2015 | Bories | G01S 7/4021 324/601 |
| 2015/0138026 A1 | 5/2015 | Shay | |
| 2015/0255868 A1 | 9/2015 | Haddad et al. | |
| 2016/0043465 A1 | 2/2016 | McDevitt et al. | |
| 2016/0191176 A1 | 6/2016 | O'Keefe et al. | |
| 2016/0197660 A1 | 7/2016 | O'Keefe et al. | |
| 2017/0084995 A1 * | 3/2017 | Yang | H01Q 3/267 |
| 2017/0117950 A1 | 4/2017 | Strong | |
| 2017/0234971 A1 * | 8/2017 | Arai | H04B 17/12 342/174 |
| 2017/0310004 A1 * | 10/2017 | Swirhun | H01Q 3/36 |
| 2017/0324486 A1 | 11/2017 | Garcia et al. | |
| 2017/0373773 A1 * | 12/2017 | Jing | H04B 17/102 |
| 2018/0034564 A1 * | 2/2018 | Tankielun | H04B 17/0085 |
| 2018/0034565 A1 * | 2/2018 | Tankielun | H01Q 3/267 |
| 2018/0062260 A1 | 3/2018 | Khalil et al. | |
| 2018/0115064 A1 * | 4/2018 | Safavi-Naeini | H01Q 3/267 |
| 2018/0198537 A1 * | 7/2018 | Rexberg | H04B 17/14 |
| 2019/0058530 A1 | 2/2019 | Rainish et al. | |
| 2019/0149247 A1 | 5/2019 | Ananth | |
| 2019/0158194 A1 | 5/2019 | Wang | |
| 2019/0267707 A1 | 8/2019 | Khalil et al. | |
| 2020/0091608 A1 | 3/2020 | Alpman et al. | |

FOREIGN PATENT DOCUMENTS

| | | |
|---|---|---|
| CN | 102347532 A | 2/2012 |
| EP | 2173010 | 4/2010 |
| EP | 2273614 | 1/2011 |
| EP | 2 285 102 A2 | 2/2011 |
| KR | 10-1564730 B1 | 10/2015 |
| WO | WO 2018/119153 A2 | 6/2018 |
| WO | WO 2018/166575 A1 | 9/2018 |

OTHER PUBLICATIONS

U.S. Appl. No. 15/590,903 including its prosecution history, including without limitation Office Actions, Amendments, Remarks and any potentially relevant documents, filed May 9, 2017, O'Brien et al.

Office Action issued on Jun. 10, 2020 for Chinese Patent Application No. 20170051930.1, 8 pages and 9 page translation.

"A calibration technique for active phased array antennas," Phased Array Systems and Technology, 2003, in 3 pages.

"Mutual coupling-based calibration of phased array antennas," Phased Array Systems and Technology, 2000, in 3 pages.

Kumar, M. et al., "Broad-Band Active Phase Shifter Using Dual-Gate MESFET", IEEE Transactions on Microwave Theory and Techniques, vol. MTT-29, No. 10, Oct. 1981, pp. 1098-1102.

Valdes-Garcia et al., "A Fully Integrated 16-Element Phased-Array Transmitter in SiGe BiCMOS for 60-GHz Communications," IEEE Journal of Solid-State Circuits (Dec. 12, 2010) vol. 45, No. 12, pp. 2757-2773.

(56) References Cited

OTHER PUBLICATIONS

Jing et al., "Self-Calibration for the Multiple Channel Phase Array System Based on Near-Field Weighting," Key Laboratory of Electronics and Information Technology in Satellite Navigation (Beijing Institute of Technology, 100081) Ministry of Education, Beijing, China, Radar Conference 2015, IET International, 6 pages.
International Search Report dated Nov. 9, 2017 for International Application No. PCT/EP2017/071427, 6 pages.
Written Opinion of the International Searching Authority dated Nov. 7, 2017 for International Application No. PCT/EP2017/071427, 10 pages.
Kanemaru et al., "79 GHz CMOS Circuits for Phase/Amplitude Calibration in High-resolution Beamforming Radar Systems", Proceedings of the $43^{rd}$ European Microwave Conference, pp. 1615-1618, 2013.
Sato et al., "Millimeter wave CMOS integrated circuit for multi-gigabit communication and radar applications", Radio-Frequency Integration Technology (RFIT) 2015 IEEE International Symposium on, pp. 49-51, 2015.
Agrawal et al., "A Calibration Technique for Active Phased Array Antennas," Johns Hopkins University Applied Physics Laboratory, 2003, in 8 pages.
Shipley et al., "Mutual Coupling-Based Calibration of Phased Array Antennas," Technology Service Corporation, 2000, in 4 pages.
Seker, "Calibration methods for phased array radars," Radar Systems Engineering Department, Aselsan, Ankara, Turkey, 2016, in 16 pages.
Office Action dated Jun. 10, 2020 in Chinese Application No. 201780051930.1.
Office Action dated Dec. 22, 2020 in Chinese Application No. 201780051930.1.
Notice of Allowance dated May 6, 2021 in Chinese Application No. 201780051930.1.

\* cited by examiner

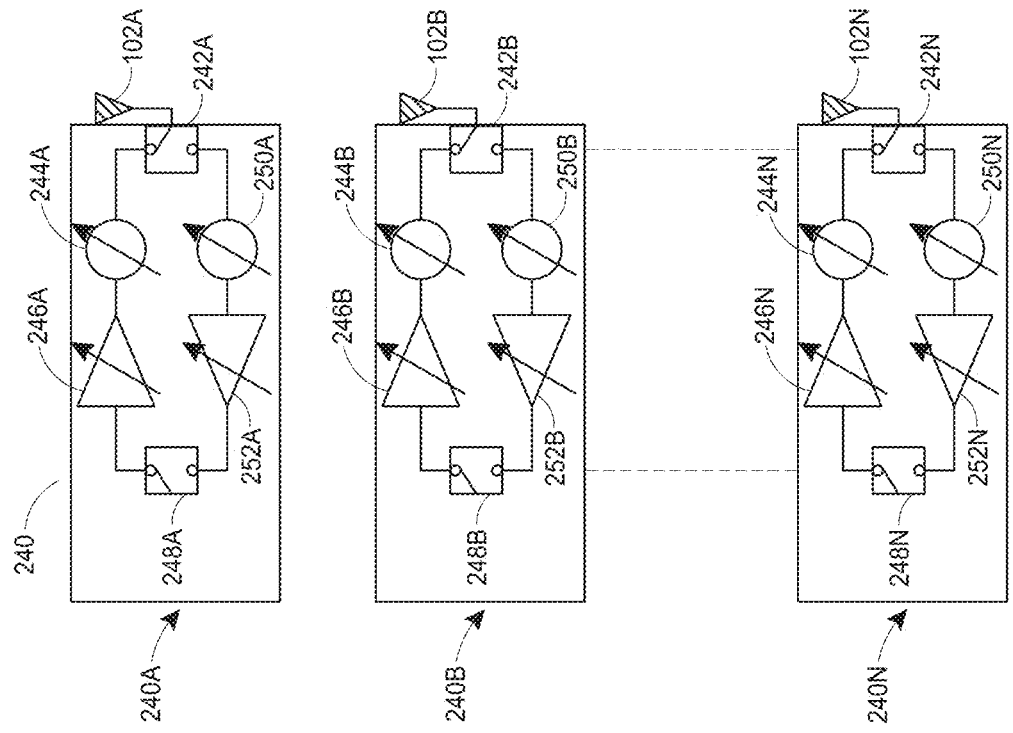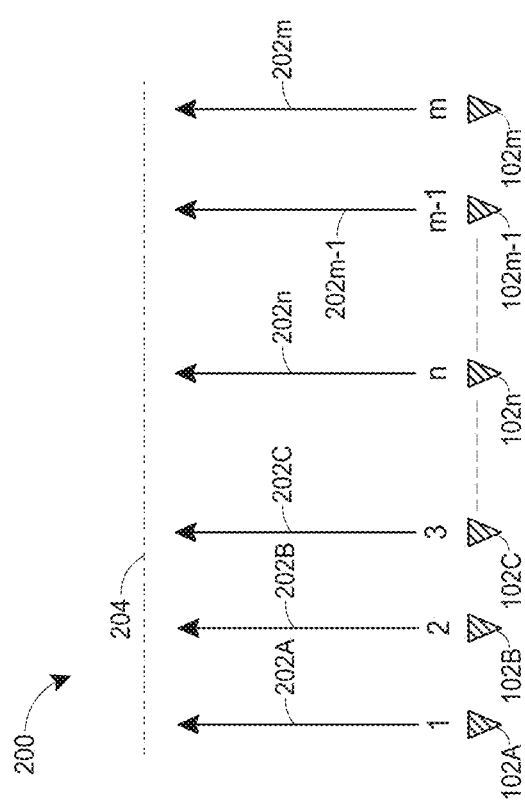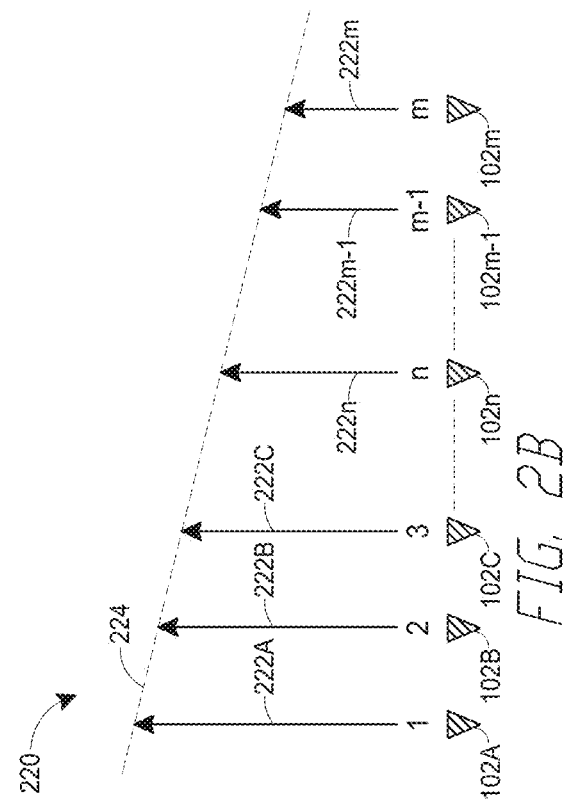

ANTENNA ARRAY CALIBRATION SYSTEMS AND METHODS

CROSS REFERENCE TO RELATED APPLICATIONS

This application is a continuation of U.S. patent application Ser. No. 15/611,289, titled "ANTENNA ARRAY CALIBRATION SYSTEMS AND METHODS," filed Jun. 1, 2017, which claims the priority benefit of U.S. Patent Application No. 62/380,328, filed Aug. 26, 2016, titled "SYSTEMS AND METHODS FOR ARRAY CALIBRATION," the disclosures of each of which are hereby incorporated by reference herein in their entireties.

FIELD OF THE DISCLOSURE

The present disclosure relates to a structure for a phased antenna array, and a calibration method thereof. In particular, near-field measurements of signal characteristics are used to calibrate the antenna systems using a coupling structure disposed between the antenna elements.

BACKGROUND

An antenna with a single antenna element will typically broadcast a radiation pattern that radiates equally in all directions in a spherical wavefront. Phased antenna arrays generally refer to a collection of antenna elements that are used to focus electromagnetic energy in a particular direction creating a main beam. Phased antenna arrays are being used more frequently in a myriad of different applications, such as in a military applications, mobile technology, on airplane radar technology, automotive radars, cellular telephone and data, and Wi-Fi technology.

The individual antenna elements of a phased-antenna array may radiate in a spherical pattern, but collectively generate a wavefront in a particular direction through constructive and destructive interference. The relative phases of the signal transmitted at each antenna element can be either fixed or adjusted, allowing the antenna system to steer the wavefront in different directions. A phased-antenna array typically includes an oscillator, a plurality of antenna elements, a phase adjuster or shifter, a variable gain amplifier, a receiver, and a control processor. A phased antenna array system uses phase adjusters or shifters to control the phase of the signal transmitted by an antenna element. The radiated patterns of the antenna elements constructively interfere in a particular direction creating a wavefront in that direction called the main beam. The phased array can realize increased gain and improve signal to interference plus noise ratio in the direction of the main beam. The radiation pattern destructively interferes in several other directions other than the direction of the main beam, and can reduce gain in those directions.

The amplitude of the signals emanating from the antenna elements affects the side lobe levels, where the side lobes are lobes of the radiation pattern that are not in the direction of the main lobe. It is generally preferable to reduce side lobe levels such that the antenna system can focus the readings from the radiation pattern to a particular desired direction. As such, the precision of the relative phase and amplitude between the elements determine the precision of the beam direction and the side lobe levels, respectively. Thus, the accuracy of the control in phase shift and amplitude for the collection of antenna elements is important to the implementation of the phased array.

SUMMARY OF THE DISCLOSURE

The innovations described in the claims each have several aspects, no single one of which is solely responsible for the desirable attributes. Without limiting the scope of the claims, some prominent features of this disclosure will now be briefly described.

One embodiment of the invention includes a method of antenna array calibration, wherein the method includes determining a first near-field amplitude relationship for a first calibration group using a first probe of the antenna array, wherein the first calibration group comprises at least a first antenna element of an antenna array and a second antenna element of the antenna array, and the first probe is disposed symmetrically between the first antenna element and the second antenna element; determining a first near-field phase relationship between at least the first antenna element and the second antenna element using the first probe; and storing the first near-field amplitude relationship and the first near-field phase relationship as calibration data for the antenna array.

One embodiment of the invention includes application of embodiments disclosed on an antenna array (e.g. multiple-in, multiple-out antenna technology).

The method may further include determining a second near-field amplitude relationship for a second calibration group using a second probe of the antenna array, wherein the second calibration group comprises at least the second antenna element and a third antenna element of the antenna array, and the second probe is disposed symmetrically between the second antenna element and the third antenna element; determining a second near-field phase relationship between at least the second antenna element and the third antenna element using the second probe; and storing the second near-field amplitude relationship and the second near-field phase relationship as calibration data for the antenna array.

Determining a first near-field amplitude relationship may further include determining an amplitude relationship among the first antenna element, the second antenna element, a third antenna element of the antenna array, and a fourth antenna element of the antenna array using the first probe, wherein the first probe is disposed symmetrically between the first antenna element, the second antenna element, the third antenna element, and the fourth antenna element; and wherein determining a first near-field phase relationship further comprises determining a phase relationship among the first antenna element, the second antenna element, the third antenna element, and the fourth antenna element using the first probe.

The method may further include deactivating antenna elements that are not included in a particular calibration group during calibration of that particular calibration group.

Determining a first near-field amplitude relationship may further include transmitting a radio frequency signal from a transmitter of the first antenna element monitoring signal levels received at the first probe with all other transmitters of the antenna array turned off; and transmitting a radio frequency signal from a transmitter of the second antenna element monitoring signal levels received at the first probe with all other transmitters of the antenna array turned off.

Determining a first near-field phase relationship may further include transmitting signals of the same amplitude from the transmitters of the first antenna element and the second antenna element; and phase shifting the signals relative to each other to identify in phase configurations.

Phase shifting may be performed using a phase shifter.

Determining a first near-field phase relationship may further include phase shifting the signals relative to each other to identify 180 degrees out of phase configurations.

The signal levels may include amplitude measurement and/or phase measurement.

Determining a first near-field amplitude relationship may further include transmitting a radio frequency signal from the probe and monitoring signal levels received at the first and second antenna elements.

Determining a first near-field phase relationship may further include receiving signals that are transmitted from the probe, wherein the transmitted signals are of the same amplitude; and phase shifting the received signals relative to each other to identify in phase configurations at the first and second antenna elements.

One embodiment of the invention includes an apparatus which may include a plurality of antenna elements of an antenna array; a plurality of probes of the antenna array, wherein the probes are disposed symmetrically between groups of antenna elements of the plurality of antenna elements, wherein the groups number at least two antenna elements each, wherein the probes can receive radio-frequency (RF) signals and each of the antenna elements can transmit RF signals for built-in near-field calibration of the antenna array; and a hardware processor of the antenna array configured to calibrate the antenna array by observations of near-field radiation obtained by using the plurality of probes.

The groups may number at least four antenna elements each.

The hardware processor may further be configured to adjust a variable gain amplifier of at least one antenna element to calibrate the antenna array.

The hardware processor may further be configured to adjust a phase shifter of at least one antenna element to calibrate the antenna array.

One embodiment includes an electronically-implemented method of calibrating an antenna array, wherein the method includes observing radiation patterns in near field measurements at least between groups of antenna elements via probes symmetrically disposed between the groups of antenna elements of the antenna array to obtain relative amplitude and phase relationships among the antenna elements of the array; generating amplitude and phase adjustments based at least in part on the obtained relative amplitude and phase relationships and on a desired antenna pattern; and applying the generated amplitude and phase adjustments to obtain the desired antenna pattern.

The method may further include repeating observing radiation patterns across a plurality of channels comprising different frequencies.

The antenna elements and probes of the antenna array may be disposed in a single or multiple array panels.

For the purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

These drawings and the associated description herein are provided to illustrate specific embodiments and are not intended to be limiting.

FIG. 2A is an illustration of a horizontal wavefront according to an embodiment.

FIG. 2B is an illustration of an angled wavefront according to an embodiment.

FIG. 2C is a schematic block diagram of a series of transceivers according to an embodiment.

DETAILED DESCRIPTION

Figure 1A:
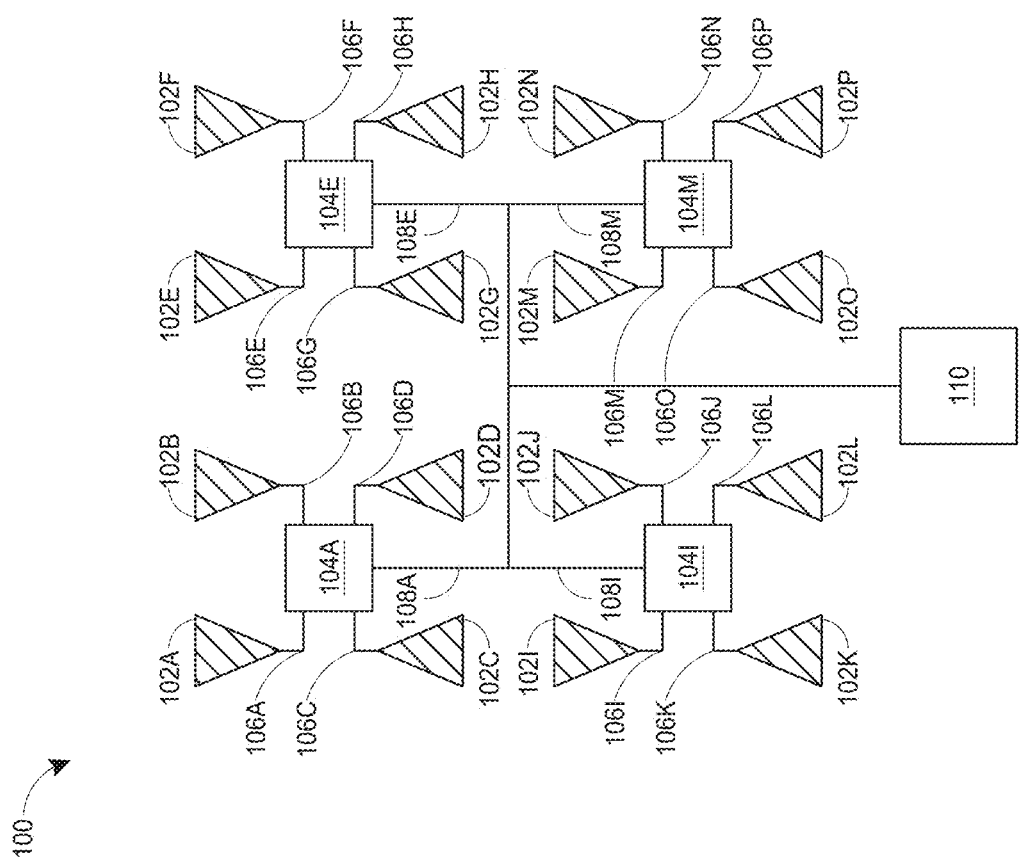
FIG. 1A is a schematic block diagram of a symmetric routing schematic for a 4-by-4 antenna array according to an embodiment.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

An antenna array can enable a beamformer to steer an electromagnetic radiation pattern in a particular direction, which generates a main beam in that direction and side lobes in other directions. The main beam of the radiation pattern is generated based on constructive inference of the signals based on the transmitted signals' phases. Furthermore, the amplitudes of the antenna elements determine side-lobe levels. A beamformer can generate desired antenna patterns by, for example, providing phase shifter settings for the antenna elements. However, over time, the amplitudes of signals and the relative phases among the antenna elements can drift from the values set when the antenna was originally calibrated. The drift can cause the antenna pattern to degrade, which can, for example, reduce the gain in a main lobe. Thus, what is needed is a way to accurately measure and control the phase and amplitude of antenna elements in an array system even after an antenna array has been fielded. Furthermore, the calibration process itself can be relatively labor intensive, time consuming, and costly. Thus, there is a need for a method of calibration without the need for expensive test equipment and facilities and having to relocate the antenna to a particular location. These disclosed techniques are also applicable to the manufacturing test environment and can be used to speed production, thus lowering costs. In one embodiment, the calibration data is used by the beamformer and combined with other data, such as pre-calculated or pre-stored antenna pattern data, to generate appropriate settings for beamforming.

The present disclosure enables an antenna array to perform calibration using relative measurements of phase and/or absolute measurements of amplitude. A probe is placed between antenna elements and the phase and/or amplitude of the antenna elements are measured. Then, the phase or amplitude can be assessed to determine adjustments that are made to the transmitter, receiver, or transceiver connected to the antenna elements. In some embodiments, the antenna elements can transmit signals, and the phase of one or more antenna elements can be adjusted until a relatively high or maximum and/or relatively low or minimum power level is reached. Upon determining a relatively high or maximum power level, the phase adjuster or shifter values are recorded as those corresponding to in phase, and for a relatively low or minimum power level, the phase values are recorded as 180 degrees out of phase. Although embodiments describe the use of a probe, it is appreciated that other structures (e.g. conductors) that can transmit and/or receive signals may also be used (e.g. slots, monopole, small patches, other coupling structures, etc).

In some embodiments, the probe should be disposed symmetrically between the antenna elements. For example, if there are two antenna elements, the probe can be placed in between the two antenna elements. In another example, if there are four antenna elements, the probe can be placed diagonally between the four antenna elements equidistant from each of the four antenna elements. Placing the probe symmetrically between antenna elements reduces or eliminates the possible variation that may occur in the propagation of the radiation pattern to or from the probe and the antenna elements.

In some embodiments, the antenna elements can be used to transmit signals to the probe, the probe receiving the transmitted signals. The probe can detect power (e.g. by using a power detector) or detect both power and phase (e.g. by using a mixer). Alternatively, the probe can be used as a transmitter, transmitting a signal to the antenna elements, where the antenna elements receive the transmitted signal.

Using a single probe to calibrate multiple antennas is advantageous. Having a single probe that may be used to transmit to the antenna elements and/or receive signals from antenna elements may itself introduce variation to the signal. However, since the same probe and components connected to the probe (e.g. mixer) are used to measure the signal, there is advantageously no part-to-part or channel-to-channel variation with the disclosed techniques. For example, the probe and the components connected to the probe will introduce the same variation to a signal received at the probe from a first and second antenna element.

By contrast, couplers used to measure phase and amplitude of a signal to calibrate antenna elements would introduce variation. A separate coupler would be connected to the transmit path of each antenna element. Then, the signal would travel along the signal route to components connected to each coupler. The routing path from each coupler to their associated connected components would introduce channel to channel variation. Each coupler may be connected to its own set of components, which despite possibly being of the same kind of components, the components themselves introduce part to part variability. Furthermore, the couplers themselves use additional hardware such as switches. The couplers themselves, often made of metallic substances, may interfere with the radiation signal making it harder to obtain higher isolation between the antenna elements. These drawbacks are reduced or eliminated by embodiments of the invention.

Embodiments of the present disclosure including using a probe disposed between antenna elements are advantageous in that the probes can be used to calibrate the array based on near field radiation measurements. Thus, the array can be calibrated without the need for far field measurements. Typically, electromagnetic anechoic chambers, (also called echo-free chambers) can be used to simulate an open space situation. The time and space in these chambers may be difficult to schedule, may be expensive, and time consuming. However, embodiments of the present disclosure avoid the need of having to place the antenna in an anechoic chamber because near-field measurements are used instead of far-field measurements. Furthermore, anechoic chambers may be practical for initial calibration, but not for later calibration. Some embodiments of the antenna array of the present disclosure may be calibrated repeatedly and at the field. The probes can be permanently placed in between antenna elements. The antenna array may be configured to allow temporary installment of the probes in between the antenna elements as well. Some embodiments of the near-field calibration of the present disclosure may also be helpful for small signal difference.

The calibration method and system can be used to calibrate arrays of different sizes. For example, the system can calibrate a planar array by calibrating a first set of antenna elements (or calibration group) that are equidistant to one probe, then calibrating a second set of antenna elements equidistant to another probe where the first and second set of antenna elements share at least one antenna element. Then, the shared antenna element can be used as a reference point to calibrate the other antenna elements.

Although the disclosure may discuss certain embodiments with the probe as the receiver and the antenna elements as the transmitter, it is understood that the probe can act as a transmitter and the antenna elements as a receiver, and vice versa.

FIG. 1A is a schematic block diagram of a symmetric routing schematic 100 according to an embodiment. The symmetric routing schematic 100 includes antenna elements, 102A, 102B, 102C, 102N, 102E, 102F, 102G, 102H, 102I, 102J, 102K, 102L, 102M, 102N, 102O, and 102P (collectively referred to herein as 102). The symmetric routing schematic 100 also includes a chip 104A, 104E, 104I, and 104M (collectively referred to herein as 104). The symmetric routing schematic 100 includes a transceiver 110 and routing paths 106A, 106B, 106C, 106D, 106E, 106F, 106G, 106H, 106I, 106J, 106K, 106L, 106M, 106N, 106O,

106P, 108A, 108E, 108I, and 108M (collectively referred to herein as 106) from the transceiver 110 to the antenna elements 102.

FIG. 1A refers to a symmetric routing schematic 100 for a 4-by-4 antenna array. The schematic refers to symmetric routing because the routes on the routing paths 106 from the transceiver 110 to the antenna elements 102 are of the same distance. For example, the routing path from transceiver 110 to antenna element 102A is a combination of the routing paths 108A and 106A, while the routing path from transceiver 110 to antenna element 102B is a combination of the routing paths 108A and 106B. The routing paths are generated to minimize variation in the distance the signal travels from the transceiver 110 to the antenna element 102. This type of configuration helps to mitigate the variation that may cause difficulties in calibration due to different lengths of routing paths the signal travels from the transceiver 110 to the antenna element 102.

The antenna elements 102 may be radiating elements or passive elements. For example, the antenna elements 102 may include dipoles, open-ended waveguides, slotted waveguides, microstrip antennas, and the like. Although some embodiments illustrate a certain number of antenna elements 102, it is appreciated that the some embodiments may be implemented on an array of two or more antenna elements.

Figure 1B:
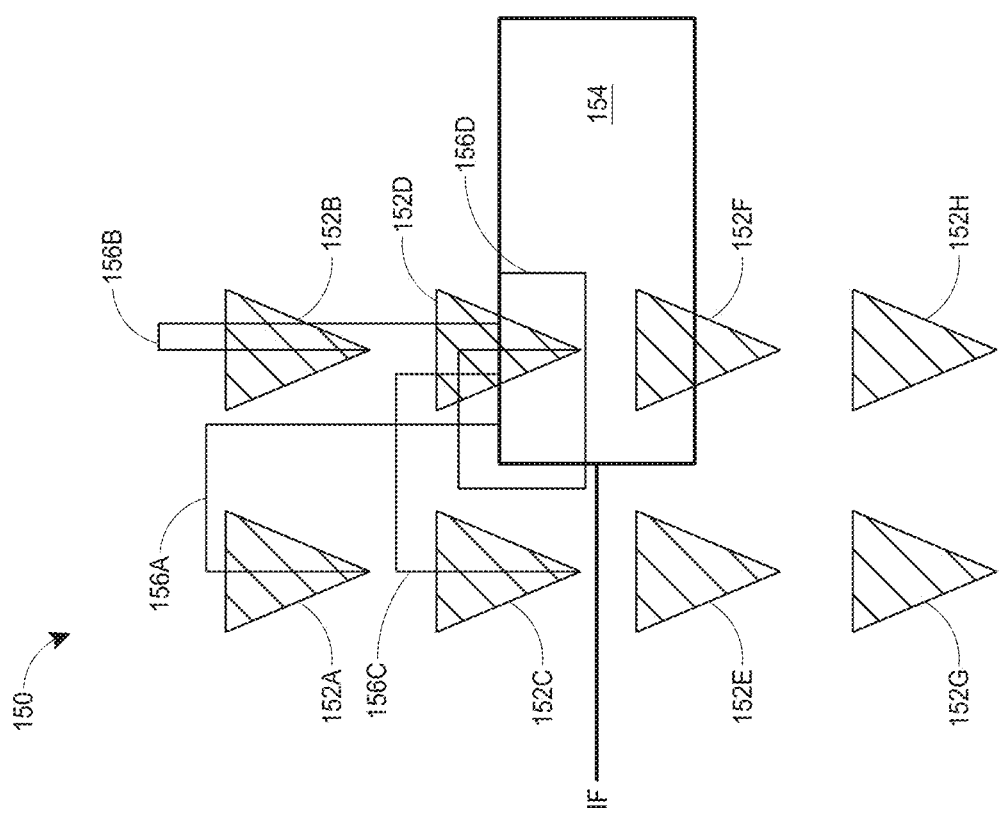
FIG. 1B is a schematic block diagram of an asymmetric routing schematic for a 2-by-8 antenna array according to another embodiment.

FIG. 1B is a schematic block diagram of an asymmetric routing schematic 150 for a 2-by-4 antenna array according to another embodiment. The asymmetric routing schematic 150 includes antenna elements 152A, 152B, 152C, 152D, 152E, 152F, 152G, and 152H (collectively referred to herein as 152). The asymmetric routing schematic 150 also includes a chip 154. The asymmetric routing schematic 150 includes routing paths 156A, 156B, 156C, and 156D (collectively referred to herein as 156) from the chip 154 to the antenna elements 152. FIG. 1B is directed to asymmetric routing because the routing paths 156 from the chip 154 to the antenna elements 152 are different in lengths. Thus, the phase and amplitude varies differently from channel to channel. For example, the transmitted signal at the antenna element 152 may be different from element to element even though the same signal was transmitted from the chip 154. In some embodiments, the received signal at the antenna elements 152 may be the same, but different when received at the chip 154 as a result of the different lengths of the routing paths 156.

FIG. 2A is an illustration of a horizontal wavefront 200 according to an embodiment. Each antenna element 102 may radiate in a spherical radiation pattern. However, the radiation patterns collectively generate a horizontal wavefront 204. The illustration 200 includes antenna elements 102A, 102B, 102C, 102N, 102M-1 and 102M. The antenna elements 102A, 102B, 102C, and 102N may be arranged linearly, where the elements are arranged on a straight line in a single dimension. In this configuration, the beam may be steered in one plane. The antenna elements may also be arranged planarly, arranged on a plane in two dimensions (N direction and M direction). In this planar configuration, the beam may be steered in two planes. The antenna elements may also be distributed on a non-planar surface. The planar array may be rectangular, square, circular, or the like. It is appreciated that the antenna may be arranged in other configurations, shapes, dimensions, sizes, types, other systems that can implement an antenna array, and the like. The illustration of the horizontal wavefront 200 shows each of the antenna elements 102 transmitting a signal 202A, 202B, 202C, 202N, 202M-1, and 202M (collectively referred to herein as 202) creating a horizontal wavefront 204. The illustration of FIG. 2A illustrates an antenna array creating a main beam that points upward, as shown by the horizontal wavefront 204. The phases from the antenna elements 102 are constructively interfering in the upward direction.

FIG. 2B is an illustration of an angled wavefront 220 according to an embodiment. The illustration of the angled wavefront 220 includes antenna elements 102A, 102B, 102C, 102N, 102M-1 and 102M. The antenna elements may be arranged similarly to that described for FIG. 2A. The illustration of an angled wavefront 220 shows the antenna elements 102 transmitting a signal 222A, 222B, 222C, 222N, 222M-1, and 222M (collectively referred to herein as 222) creating a wavefront 224 that propagates at an angle, different from the direction of the wavefront 204 in FIG. 2A. The phases of the signals 222 are constructively interfering in the direction that the angled wavefront 220 is traveling (e.g. up-right direction). Here, each of the phases of the antenna elements 102 may be shifted by the same degree to constructively interfere in a particular direction.

The antenna elements 102 can be spaced apart equidistant from one another. In some embodiments, the antenna elements 102 are spaced at different distances from each other, but with a probe equidistant from at least two antenna elements 102.

Although the disclosure may discuss certain embodiments as one type of antenna array, it is understood that the embodiments may be implemented on different types of antenna arrays, such as time domain beamformers, frequency domain beamformers, dynamic antenna arrays, active antenna arrays, passive antenna arrays, and the like.

FIG. 2C is a schematic block diagram of a series of transceivers 240A, 240B, 240N (collectively referred to herein as 240) according to an embodiment. In some embodiments, a single transceiver 240 feeds to a single antenna element 102. However, it is appreciated that a single transceiver 240 may feed to multiple antenna elements 102, or a single antenna element 102 may be connected to a plurality of transceivers 240. Furthermore, it is appreciated that the antenna element 102 may be linked to a receiver and/or a transmitter.

In some embodiments, the transceiver 240 may include a switch 242A, 242B, 242N (collectively referred to herein as 242) to switch the path from the antenna element 102 to the receiver or the transmitter path. The transceiver 240 includes another switch 248A, 248B, 248N (collectively referred to herein as 248) that switches the path from the signal processor (not shown) to the receiver or the transmitter path. The transmitter path has a phase adjuster 244A, 244B, 244N (collectively referred to herein as 244) and a variable gain amplifier 246A, 246B, 246N (collectively referred to herein as 246). The phase adjuster 244 adjusts the phase of the transmitted signal at the antenna element 102 and the variable gain amplifier 246 adjusts the amplitude of the transmitted signal at the antenna element 102. Although the embodiments describe the transceiver 240 including a phase adjuster 244 and a variable gain amplifier 246, other components can be used to adjust the magnitude of the signal and/or the phase of the signal. Furthermore, although a switch is shown to switch from the transmitter path to the receive path, other components can be used, such as a duplexer.

The receiver path may also have a phase adjuster 250A, 250B, 250N (collectively referred to herein as 250), and a variable gain amplifier 252A, 252B, 252N (collectively referred to herein as 252). The phase adjuster 250 and the variable gain amplifier 252 can be used to adjust the received signal from the antenna element 102 before going to the signal processor (not shown).

Figure 2D:
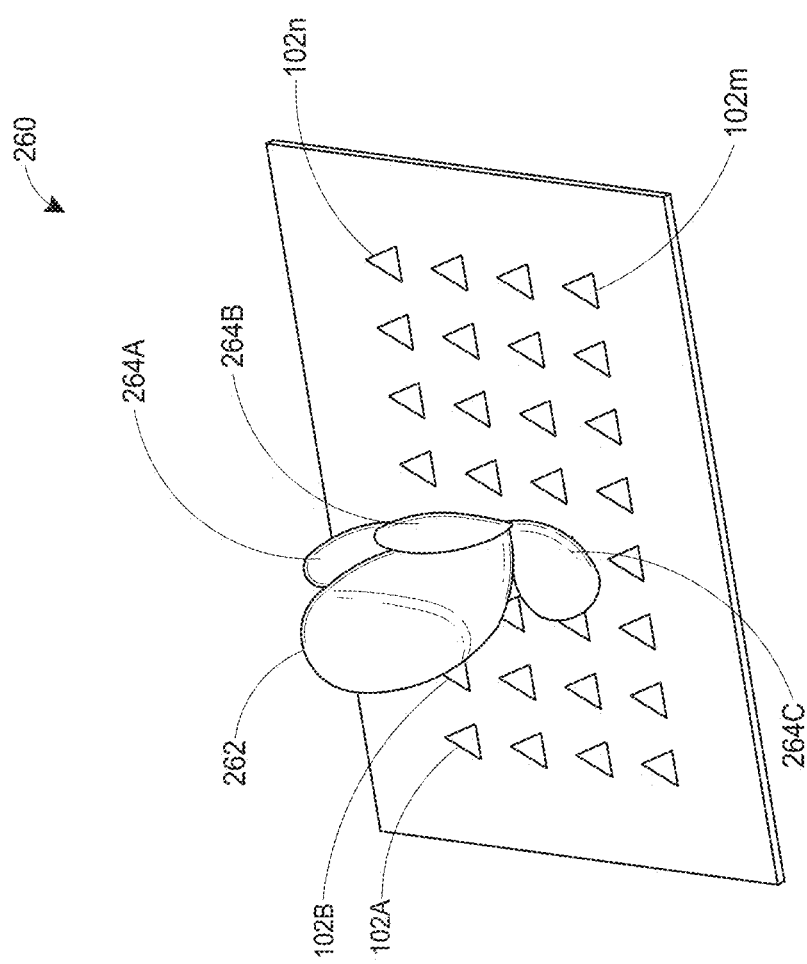
FIG. 2D is an illustration of a planar array and an associated electromagnetic pattern according to an embodiment.

FIG. 2D is an illustration of a planar phased array 260 and an associated electromagnetic pattern according to an embodiment. FIG. 2D includes antenna elements 102A, 102B, 102N, 102M-1, and 102M. FIG. 2D also includes a beam pattern with a main beam 262, and side lobes 264A, 264B, 264C. The antenna elements 102 are transmitting a signal where the phase of the signal is constructively interfering in the direction of the main beam 262. The precision of the amplitude of the antenna elements 102 controls the side-lobe levels. For example, the more uniform the amplitudes of the transmitted signals from the antenna elements 102 are, the lower the side lobe levels will be. The antenna elements 102 may be disposed on a single die, or multiple dies.

Figure 3A:
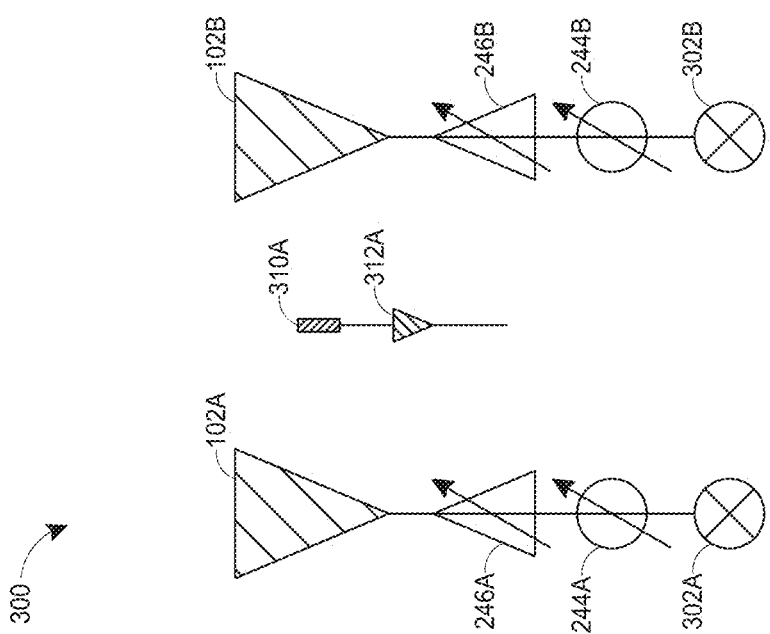
FIG. 3A is a schematic block diagram of a probe with a power detector disposed between two antenna elements according to an embodiment.

FIG. 3A is a schematic block diagram 300 of a probe 310A with a power detector 312A disposed between two antenna elements 102A, 102B according to an embodiment. In this block diagram 300, the probe is disposed equidistant between the two antenna elements 102A, 102B. The probe 310A may be a slot, a probe, a coupling element, any component that can be used to detect signals, or the like. The probe can be used as a transmitter.

Figures 1, 3B:
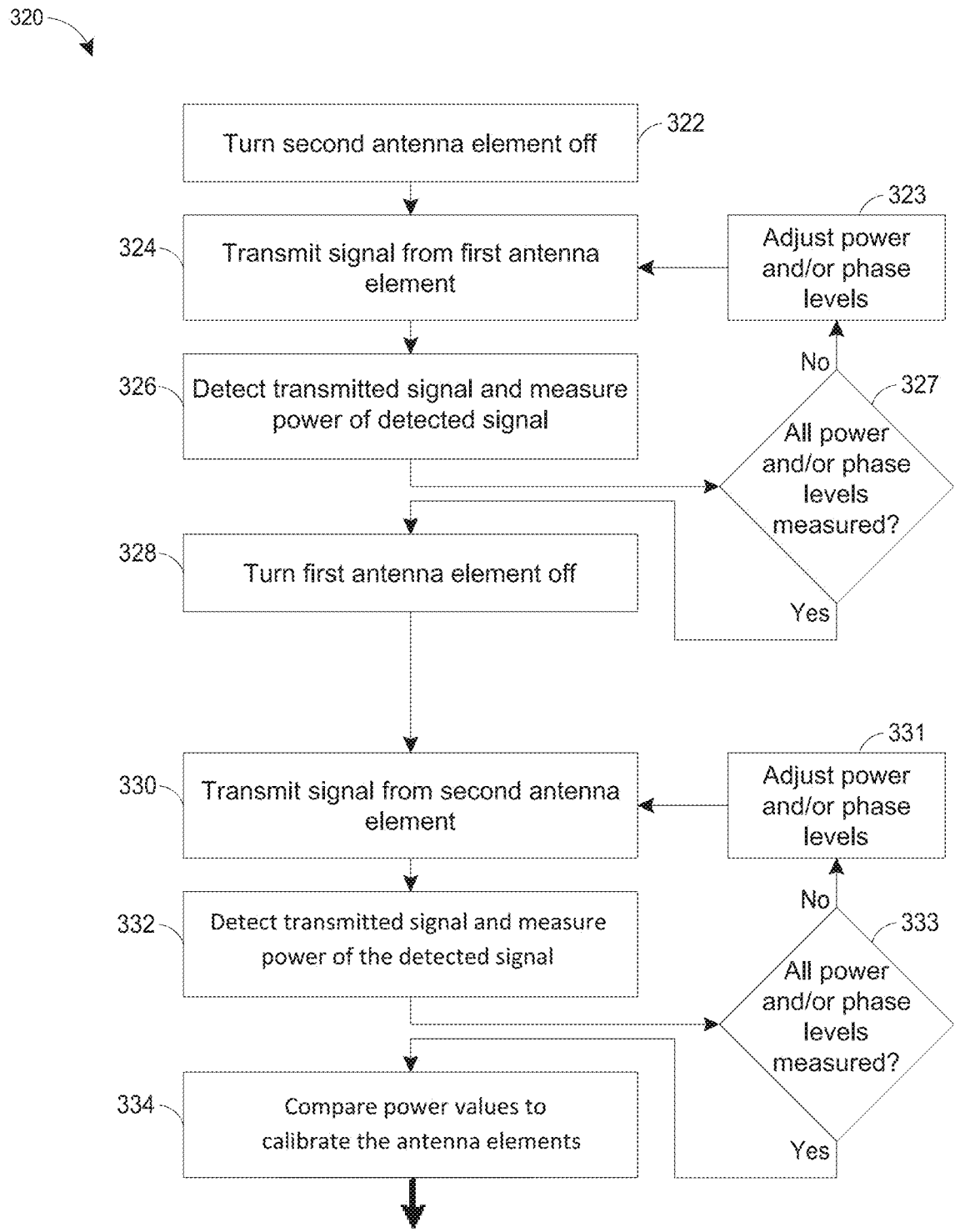
FIGS. 3B-1 and 3B-2 are flow diagrams for calibration using a probe with a power detector disposed between two antenna elements according to an embodiment.
Figures 2, 3B:
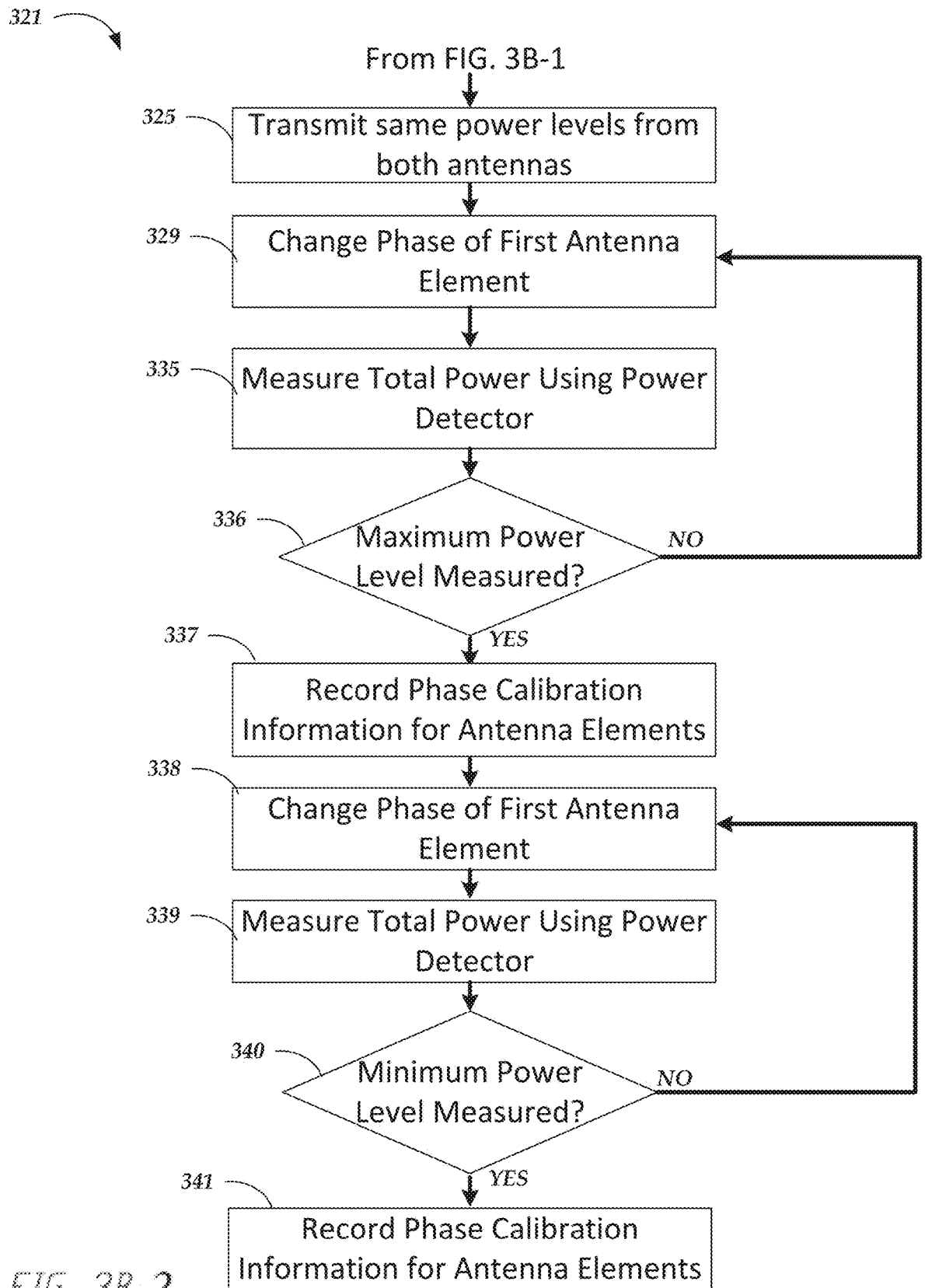

FIGS. 3B-1 and 3B-2 is a flow diagram for calibration using a probe with a power detector disposed between two antenna elements according to an embodiment.

FIG. 3B-1 illustrates a flow diagram 320 for measuring and comparing all power levels for the two antenna elements 102A, 102B. At block 322, the transmitter tied to the antenna element 102B is turned off. At block 324, a signal is transmitted from the first antenna element 102A. A signal is generated from the mixer 302A, amplified by the variable gain amplifier 246A, shifted in phase by the phase adjuster 244A, and transmitted from the antenna element 102A. At block 326, the probe 310A detects the transmitted signal from the antenna element 102A and the power detector 312A detects power values of the detected signal. At block 327, the system can determine whether all power and/or phase levels are measured. If yes, then the system can continue to block 328. If not, then the power and/or phase can be adjusted in block 323, and proceed back to block 324. For example, a combination of each power level and each phase level can be measured. In some embodiments, the phase and amplitude are decoupled such that each power level can be measured and each phase level measured independently without having to measure every combination of each power level and each phase level.

At block 328, the transmitter tied to the antenna element 102A is turned off. At block 330, a signal is transmitted from the second antenna element 102B. A signal is generated from the mixer 302B, amplified by the variable gain amplifier 246B, shifted in phase by the phase adjuster 244B, and transmitted from the antenna element 102B. At block 332, the probe 310A detects the transmitted signal from the antenna element 102B and the power detector 312A detects power values of the detected signal.

At block 334, once the detected signals from the transmitted signals of antenna elements 102A and 102B are stored, the power values are compared to calibrate the transmitter connected to the antenna element 102A relative to the transmitter connected to the antenna element 102B, and/or vice versa. The power values are calibrated by adjusting the gain of the variable gain amplifier 246A and/or 246B. In some embodiments, the calibration is performed during, before, or after other blocks in FIG. 3B. After comparing power values to calibrate the antenna elements at block 334, the flow can continue to FIG. 3B-2.

FIG. 3B-2 illustrates a flow diagram 321 for calibrating the phase for the two antenna elements 102A, 102B. At block 325, a signal of the same power level is transmitted from both antenna elements 102A, 102B. This can be achieved using data obtained from the steps in FIG. 3B-1. At block 329, the phase of the first antenna element 102A is changed. Then at block 335, the total power can be measured by a power detector 312A. The system determines whether the maximum power level is measured at block 336. If not, then the system continues to change the phase of the first antenna element 102A and continues the flow diagram from block 329. If the maximum power level is measured at block 336, then the phase can be determined to be in an in-phase condition. The phases that provide the maximum power level at block 336 is recorded for the antenna elements at block 337.

At block 338, the phase of the first antenna element 102A is changed, and at block 339, the total power is measured using the power detector 312A. At block 340, the system determines whether the minimum power level is measured. If not, then the phase of the first antenna element 102A is changed and the flowchart continues from block 338. If the minimum power level is measured, then the system records the phase calibration information for the antenna elements at block 341. This can be considered a 180 degrees out of phase condition.

Figure 3C:
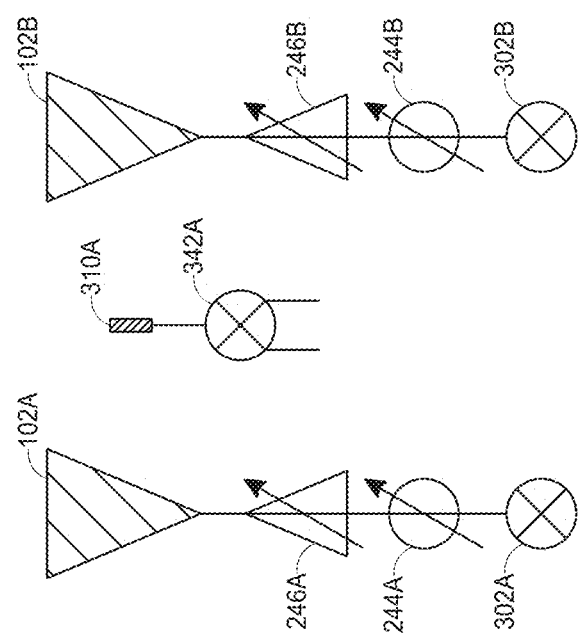
FIG. 3C is a schematic block diagram of a probe with a mixer disposed between two antenna elements according to an embodiment.

FIG. 3C is a schematic block diagram 330 of a probe 310A with a mixer 342A disposed between two antenna elements 102A, 102B according to an embodiment. The probe 310A may be disposed equidistant from the antenna elements 102A and 102B. The probe 310A is connected to the mixer 342A.

Figure 3D:
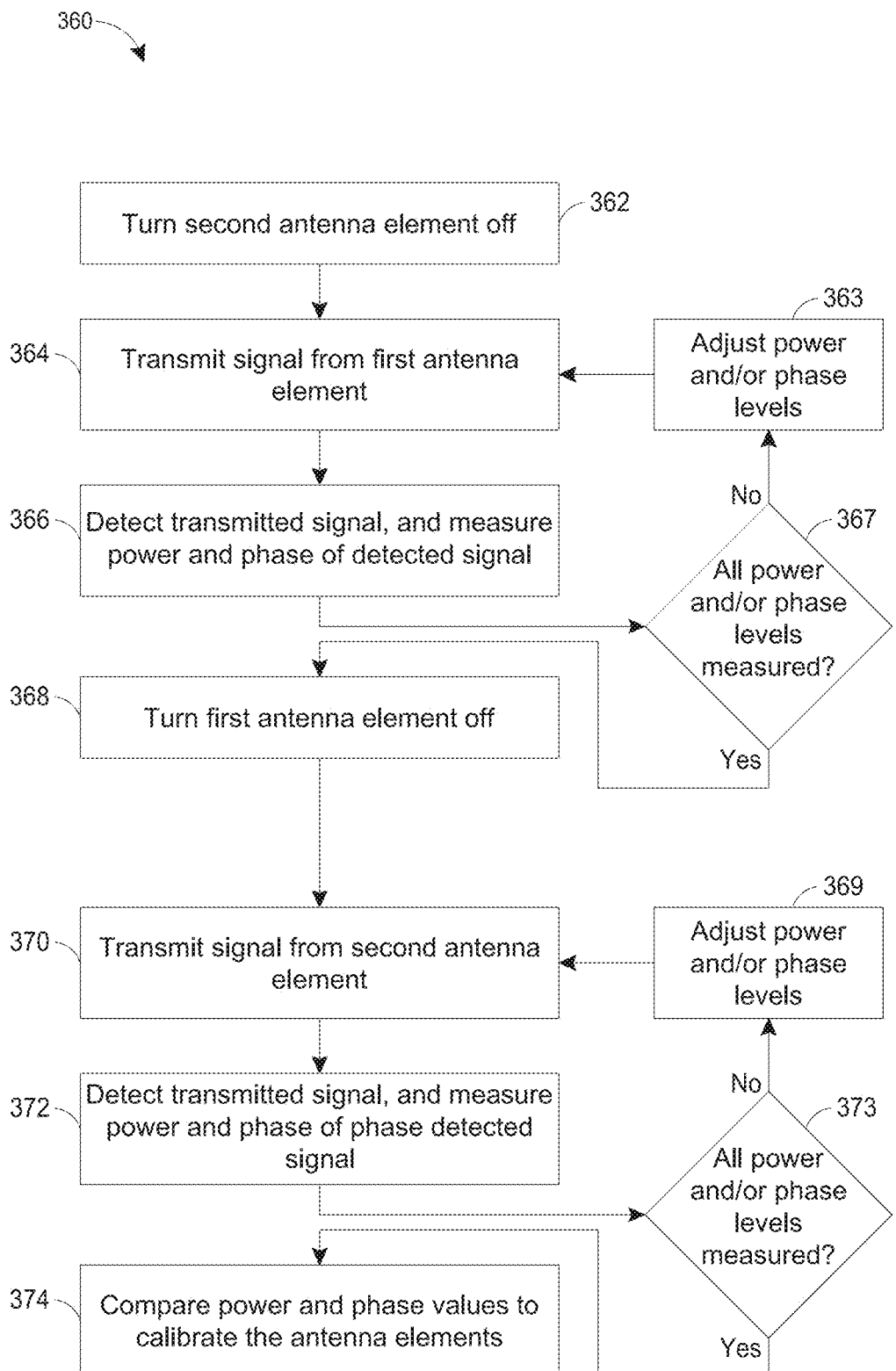
FIG. 3D is a flow diagram for calibration using a probe with a mixer disposed between two antenna elements according to an embodiment.

FIG. 3D is a flow diagram 360 for calibration using a probe with a mixer disposed between two antenna elements according to an embodiment. The mixer can be used to measure phase and/or amplitude. At block 362, the transmitter connected to antenna element 102B is turned off. At block 364, a signal is generated from the mixer 302A, amplified by the variable gain amplifier 246A, phase shifted by the phase adjuster 244A, and transmitted by the antenna element 102A. At block 366, the probe 310A detects the transmitted signal and using the mixer, the signal processor measures and records the amplitude and phase values. At block 367, the system can determine whether all power and/or phase levels have been measured. If yes, then the system can proceed to block 368. If no, then the system can adjust power and/or phase levels in block 363, and return to block 324.

At block 368, the transmitter connected to the antenna element 102A is turned off. At block 370, a signal is generated from the mixer 302B, amplified by the variable gain amplifier 246B, shifted in phase by the phase adjuster 244B, and transmitted by the antenna element 102B. At block 372, the probe 310A detects the signal, the mixer mixes the signal, and the signal processor measures and records the phase and amplitude values. At block 373, the system can determine whether all power and/or phase levels have been measured. If yes, then the system can proceed to block 374. If no, then the system can adjust power and/or phase levels in block 369, and return to block 370.

At block 374, based on a comparison between the amplitudes of the signals transmitted by the antenna element 102A and 102B, the variable gain amplifiers 246A, 246B are adjusted such that the amplitudes are calibrated to transmit substantially the same power based on the same signal generated. Furthermore, based on a correlation between the phases of the signals transmitted by the antenna element 102A and 102B, the phase adjusters 244A and 244B are adjusted such that the phases are calibrated to transmit at substantially the same phase for the same generated signal.

The values of the variable gain amplifier 246A, 246B and/or the phase adjusters 244A, 244B may be controlled using a digital command sent through the beam steering interface, such as the beam steering chip or the signal processor. The phase adjuster may be an n-bit phase adjuster providing control of the phase in a total of a particular number of phase degrees. Thus, the calibration process may be calibrated to be the state that allows for the closest phase value. In some embodiments, the calibration is performed during, before, or after other blocks in FIG. 3D.

Figure 4:
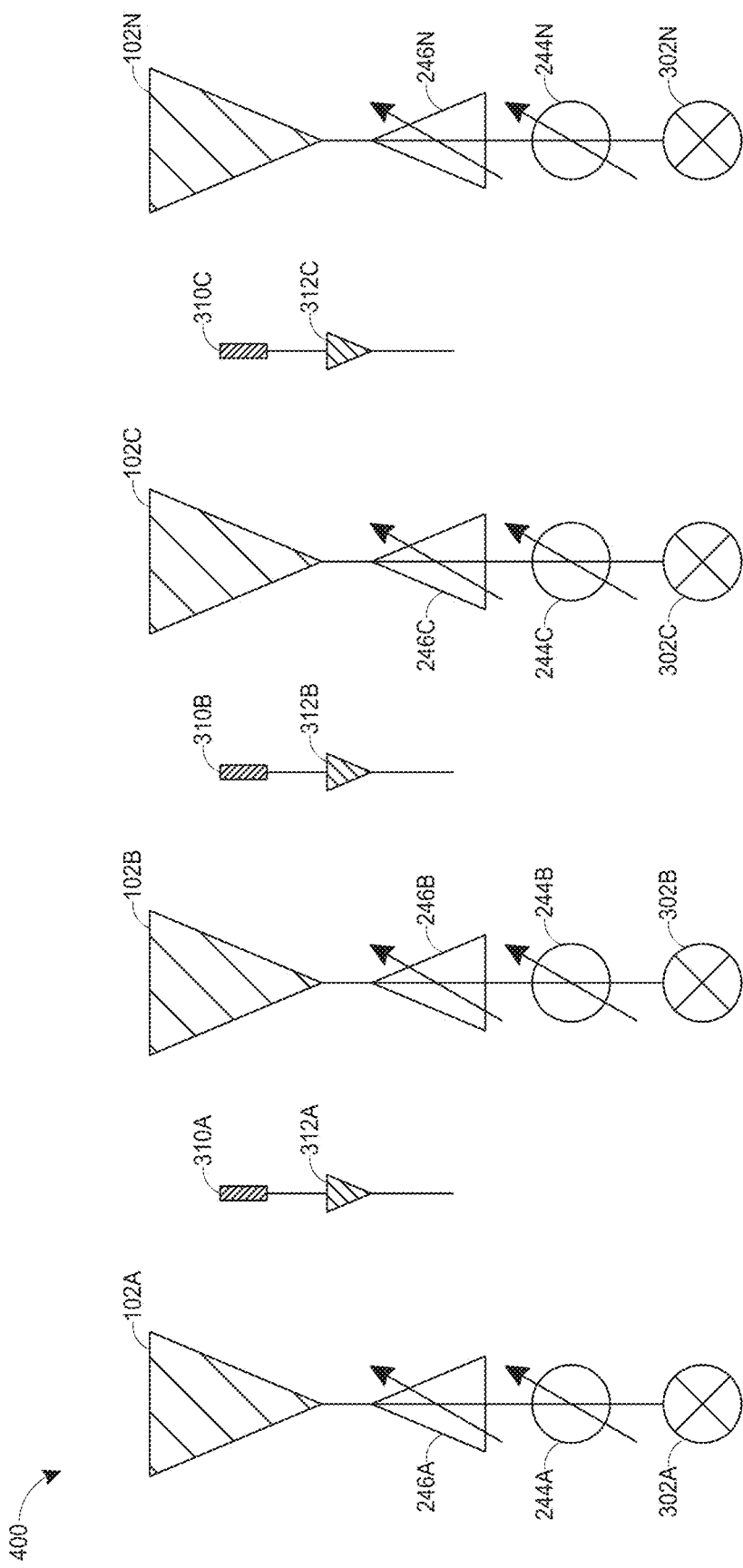
FIG. 4 is a schematic block diagram of probes disposed between four antenna elements according to an embodiment.

FIG. 4 is a schematic block diagram 400 of probes 310A, 310B, 310C disposed between four antenna elements 102A, 102B, 102C, 102N according to an embodiment. In the block diagram 400, probe 310A is disposed equidistant from antenna element 102A and antenna element 102B. The probe 310B is disposed equidistant from antenna element 102B and antenna element 102C. The probe 310C is disposed equidistant from antenna element 102C and antenna element 102N. The antenna elements 102A, 102B, 102C, and 102N are disposed linearly.

In this embodiment, antenna elements 102A and 102B are calibrated first. The transmitters connected to the antenna elements 102B, 102C, and 102N are turned off. The mixer 302A generates a signal, the signal shifted in phase by the phase adjuster 244A, the signal amplified by a variable gain amplifier 246A, and transmitted from the antenna element 102A. The probe 310A receives the signal. Next, the antenna 102B transmits a signal that the same probe 310A detects. In this embodiment, the probe 310A is connected to a power detector 312A. Antenna elements 102A and 102B are calibrated similar to the process described in FIG. 3A. However, the probe 310A may be connected to mixers and may be calibrated similar to the process described in FIG. 3B. Other ways of calibration are possible. For example, other components may be connected to the probe 310A to measure phase and/or amplitude. Furthermore, other methods of calibration may be used using relative measurements of phase and/or amplitude.

Next, antenna elements 102B and 102C are calibrated. Then, 102C and 102N are calibrated. In this embodiment, the calibration occurs serially. However, calibration may occur in different time steps. For example, when antenna element 102B is transmitting a signal to calibrate with antenna 102A, not only can probe 310A be detecting the signal, but also probe 310B may detect the signal. Thus, while antenna elements 102A and 102B are being calibrated, the calibration between antenna elements 102B and 102C can begin in parallel. In this embodiment, neighboring antenna elements are being calibrated. However, it is appreciated that any set of antenna elements that are equidistant from the probe can be calibrated. For example, the first and fourth antenna element 102A, 102N can be calibrated with a probe 310B between the second and third antenna element 102B, 102C.

Figure 5A:
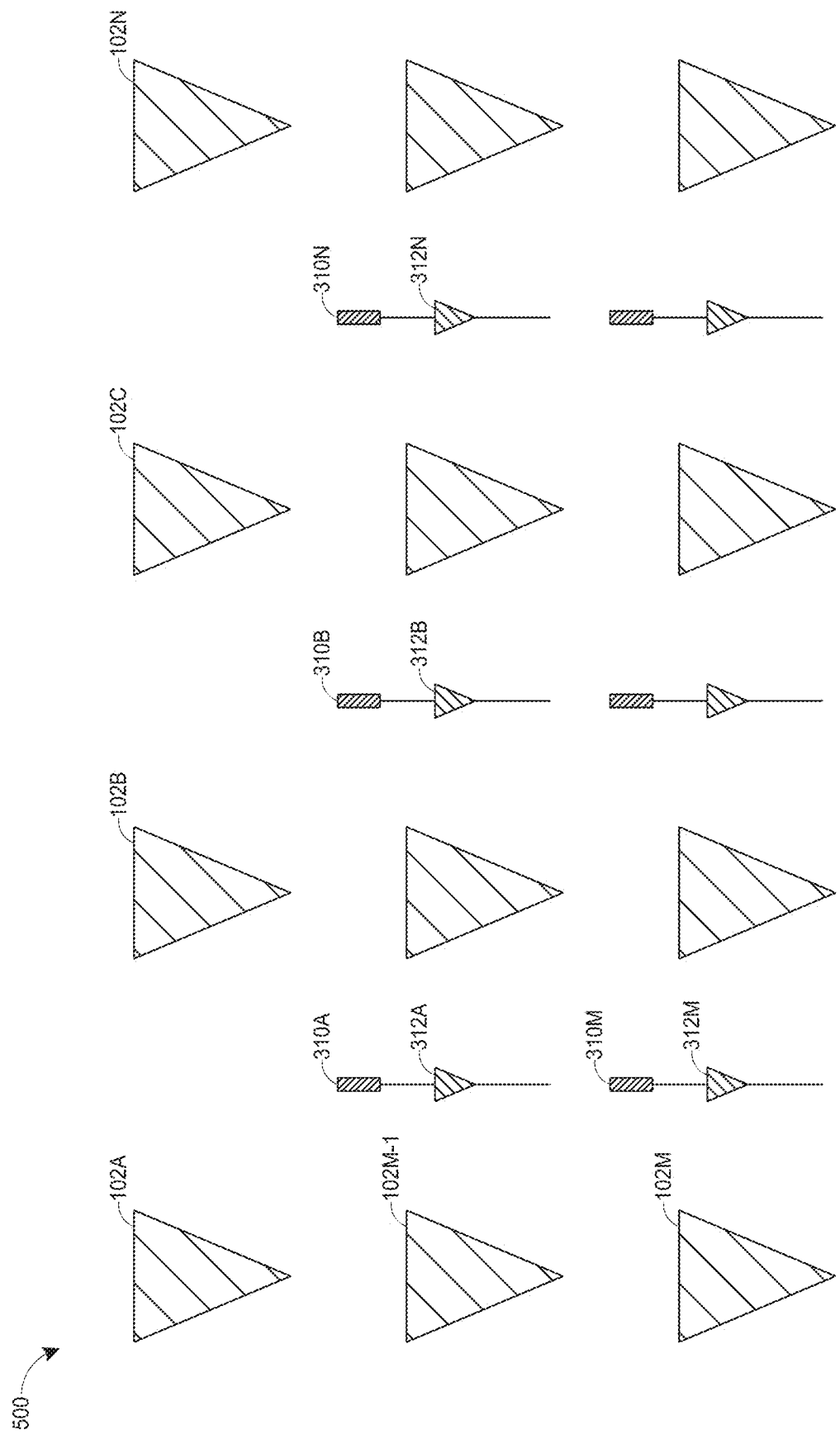
FIG. 5A is a schematic block diagram of probes disposed between an array of three by four antenna elements according to an embodiment.

FIG. 5A is a schematic block diagram of probes disposed between an array of three by four antenna elements according to an embodiment. The probes 310A, 310B, 310C . . . 310M (collectively referred to herein as 310) are disposed symmetrically between a set of four antenna elements 102. In this embodiment, the probe 310 is equidistant from each antenna element 102 in the set of four antenna elements. However, it is appreciated that the probe 310 may be placed at some distance that is equidistant from at least two antenna elements 102.

Figure 5B:
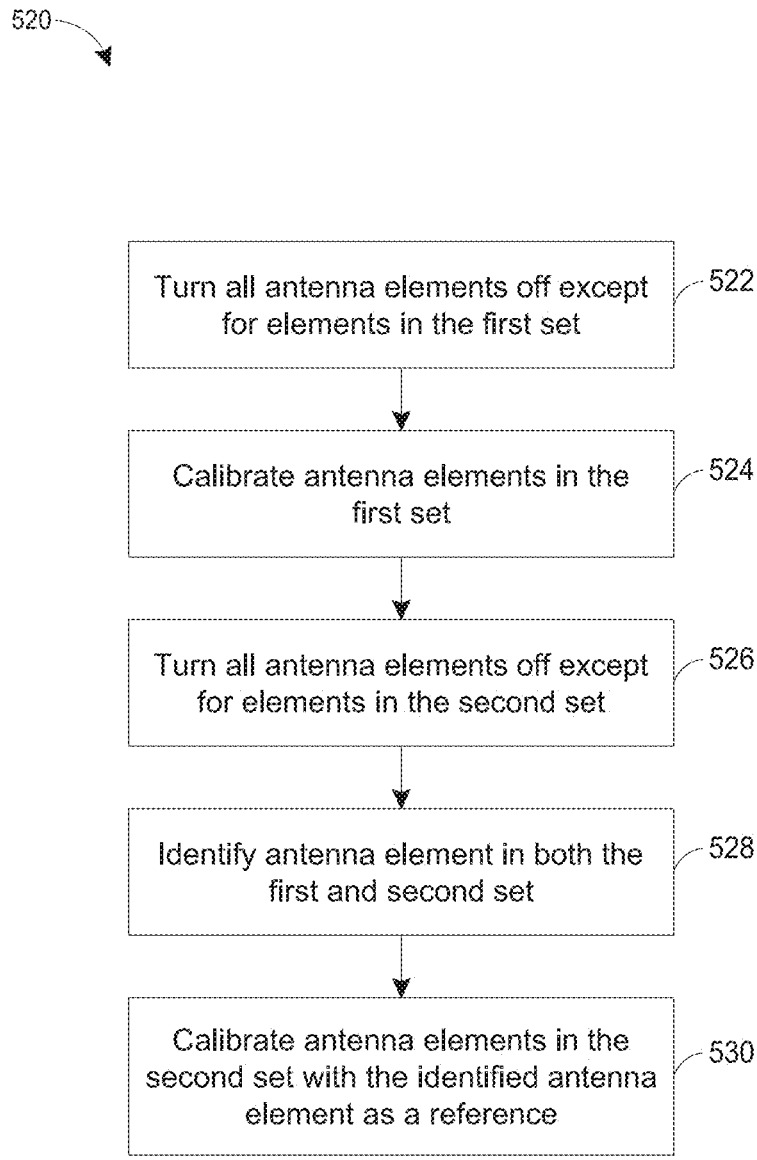
FIG. 5B is a flow diagram for calibration using probes disposed between an array of three by four antenna elements according to an embodiment.

FIG. 5B is a flow diagram for calibration using probes disposed between an array of three by four antenna elements according to an embodiment.

At block 522, all transmitters connected to all antenna elements 102 are turned off. At block 524, the first set of four antenna elements is calibrated together. Then, the first antenna element 102A transmits a signal. The probe 310A receives this signal, measures the power using the power detector 312A, and records the power. This is repeated for the other three antenna elements 102 that are equidistant from the first probe 310A. Then, the gain of each antenna element 102 within the set of four antenna elements is adjusted to be calibrated in relation to one another. Then, all four antenna elements 102 transmit a signal, the phase adjusted, and the phase recorded to identify the phase configurations that provide maximized power (e.g. the phase values are equal). The same test is performed for when the power is minimized (e.g. phases are 180 degrees apart). Calibration can be performed in a similar manner to that described in FIG. 3A, 3B, and other ways described in this disclosure.

Although the disclosure may discuss certain embodiments as calibrating four antennas at once, it is understood that the embodiments may be implemented using a different number of transmitters, antenna elements, probes, and the like. For example, the power can be calibrated for four antenna elements at once (e.g. once power is recorded for four antenna elements, the gain for each of the four antenna elements can be adjusted to meet a reference gain value), while the phase can be calibrated in pairs (e.g. calibrate antenna elements 102A and 102B first, then calibrate antenna elements 102A and 102M-1 next).

After the antenna elements 102 within the set of four antenna elements have been calibrated in reference to one another, the calibration procedure may calibrate the next set of four antenna elements 102. Antenna elements except for the antenna elements in the next set are turned off at block 526. At block 528, an antenna element that is in both the first and second set is identified. Then at block 530, the next set of antenna elements are calibrated with the identified antenna element as a reference. The next set of four antenna elements 102 may be equidistant from the next probe 310B. The same or a different calibration method may be used for the next set of four antenna elements 102. After the sets of antenna elements 102 across the row of elements are calculated, the process can be repeated for the following column of a set of four antenna elements 102. For example, after the set of antenna elements 102 have been calibrated using the probes 310A, 310B, and 310C, then the next set of four antenna elements 102 to be calibrated may be those that are equidistant from the probe 310M.

Once the power values are calibrated, the transmitter connected to the antenna element 102A and the transmitter connected to the antenna element 102B are turned on. Based on the power calibration, the antenna elements 102A and 102B transmit signals at substantially the same power level. Adjust one or both of the phase adjuster 244A or 244B. The probe 310A will receive both signals from antenna elements 102A and 102B and detect the power values at the power detector 312A. When the power is maximized, the phase adjuster 244A and 244B are aligned (e.g. the phase values are equal). When the power is minimized, the phase adjuster 244A and 244B are opposite (e.g. phase of one equals the phase of the other plus 180 degrees). Using this relative relationship, the system can calibrate the phase of one antenna element relative to the other antenna element.

Figure 6A:
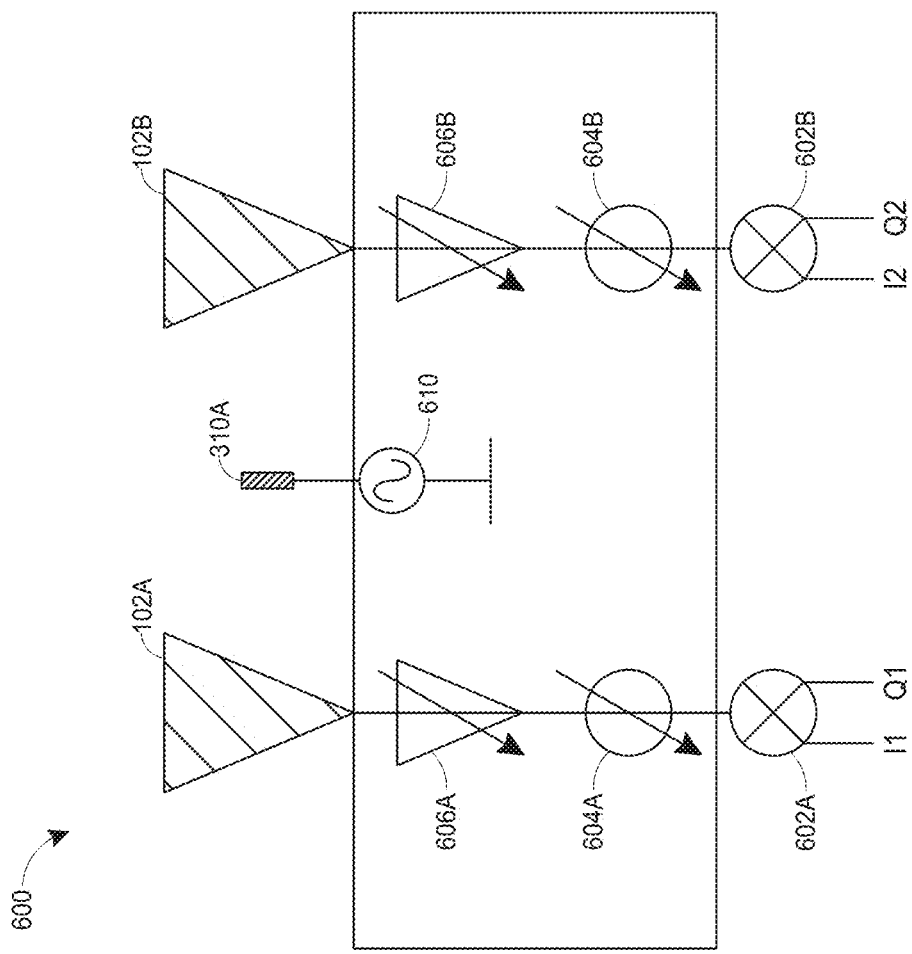
FIG. 6A is a schematic block diagram of a probe with an RF power source disposed between two antenna elements according to an embodiment.

FIG. 6A is a schematic block diagram of a probe 310A with an RF power source 610 disposed between two antenna elements 102A, 102B according to an embodiment. In this block diagram 600, the probe 310A is disposed equidistant between the two antenna elements 102A, 102B. The probe 310A may transmit a signal for the antenna elements 102A and 102B to receive.

Figure 6B:
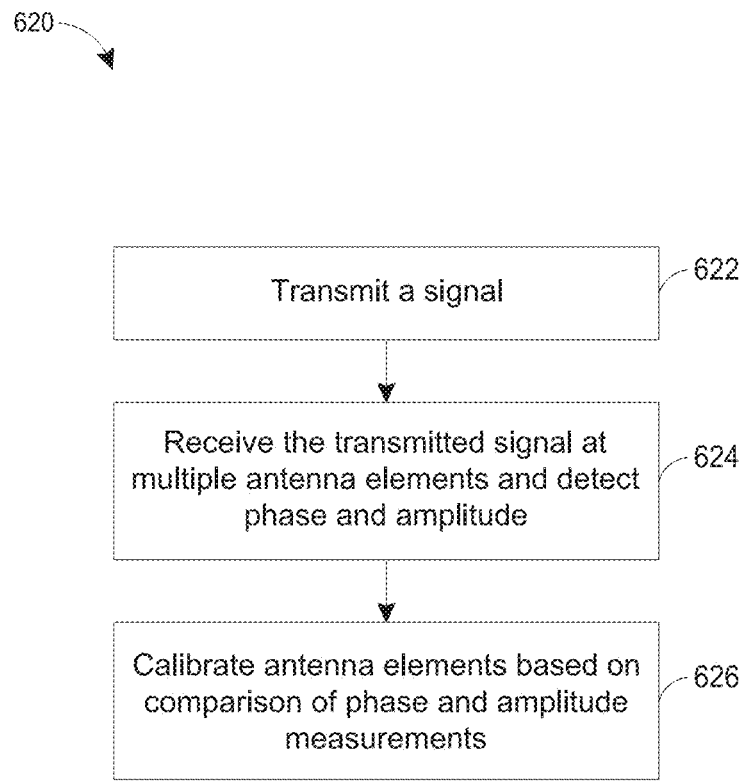
FIG. 6B is a flow diagram for calibration using a probe with an RF power source disposed between two antenna elements according to an embodiment.

FIG. 6B is a flow diagram for calibration using a probe with an RF power source disposed between two antenna elements according to an embodiment. At block 622, the probe 310A is a radiating element that transmits a signal. The probe 310A can be connected to an RF power source 610. At block 624, the antenna elements 102A, 102B receives the signal transmitted from the probe 310A. The antenna elements 102A, 102B can be connected to a phase adjuster 604A and 604B, the variable gain amplifier 606A, 606B, and an I/Q mixer 602A, 602B. The antenna elements 102A, 102B receives the signal and detects the phase and amplitude using the I/Q mixer 602A, 602B. At block 626, the antenna elements are calibrated based on a comparison of the detected phase and amplitude measurements.

Any of the principles and advantages discussed herein can be applied to other systems, not just to the systems described above. Some embodiments can include a subset of features and/or advantages set forth herein. The elements and operations of the various embodiments described above can be combined to provide further embodiments. The acts of the methods discussed herein can be performed in any order as appropriate. Moreover, the acts of the methods discussed herein can be performed serially or in parallel, as appropriate. While circuits are illustrated in particular arrangements, other equivalent arrangements are possible.

Any of the principles and advantages discussed herein can be implemented in connection with any other systems, apparatus, or methods that benefit could from any of the teachings herein. For instance, any of the principles and advantages discussed herein can be implemented in connection with any devices with a need to adjust the amplitude or phase of a phased array.

Aspects of this disclosure can be implemented in various electronic devices. For instance, one or more of the above phased array embodiments can implemented in accordance with any of the principles and advantages discussed herein can be included in various electronic devices. Examples of the electronic devices can include, but are not limited to, cell phone base stations, radar systems, radar detectors, consumer electronic products, parts of the consumer electronic products such as semiconductor die and/or packaged modules, electronic test equipment, etc. Examples of the electronic devices can also include communication networks. The consumer electronic products can include, but are not limited to, a phone such as a smart phone, a laptop computer, a tablet computer, a wearable computing device such as a smart watch or an ear piece, an automobile, a camcorder, a camera, a digital camera, a portable memory chip, a washer, a dryer, a washer/dryer, a copier, a facsimile machine, a scanner, a multifunctional peripheral device, a wireless access point, a router, etc. Further, the electronic device can include unfinished products, including those for industrial and/or medical applications.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected, or connected by way of one or more intermediate elements. Thus, although the various schematics shown in the figures depict example arrangements of elements and components, additional intervening elements, devices, features, or components may be present in an actual embodiment (assuming that the functionality of the depicted circuits is not adversely affected). Additionally, the words "herein," "above," "below," and words of similar import, when used in this application, shall refer to this application as a whole and not to any particular portions of this application. Where the context permits, words in the Detailed Description of Certain Embodiments using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values or distances provided herein are intended to include similar values within a measurement error.

While certain embodiments have been described, these embodiments have been presented by way of example only, and are not intended to limit the scope of the disclosure. Indeed, the novel apparatus, systems, and methods described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An electronically-implemented method of calibrating an antenna array, the electronically-implemented method comprising:

wirelessly transmitting a signal from a first probe to a first calibration group of the antenna array, wherein the first calibration group comprises at least a first antenna element of the antenna array and a second antenna element of the antenna array, and the first probe is dedicated for calibration and is disposed symmetrically between the first antenna element and the second antenna element, wherein the first probe is electrically connected to a first dedicated calibration transmitter, and wherein the first and second antenna elements are electrically connected to transmitters different than the first dedicated calibration transmitter;

transmitting a radio frequency signal from a transmitter of the first antenna element while all other transmitters of the antenna array are turned off;

monitoring first signal levels received at the first probe associated with the radio frequency signal from the transmitter of the first antenna element with all other transmitters of the antenna array turned off, wherein the monitoring the first signal levels comprises measuring power for each of a plurality of phases of respective individual signal levels of the first signal levels;

transmitting a radio frequency signal from a transmitter of the second antenna element while all other transmitters of the antenna array are turned off;

monitoring second signal levels received at the first probe associated with the radio frequency signal from the transmitter of the second antenna element with all other transmitters of the antenna array turned off, wherein the monitoring the second signal levels comprises measuring power for each of a plurality of phases of respective individual signal levels of the second signal levels;

determining a first near-field amplitude relationship between at least the first antenna element and the second antenna element based on the signal transmitted from the first probe and the first and second signal levels received at the first probe;

determining a first near-field phase relationship between at least the first antenna element and the second antenna element based on the signal transmitted from the first probe;

storing the first near-field amplitude relationship and the first near-field phase relationship as calibration data for the antenna array;

wirelessly transmitting a signal from a second probe to a second calibration group of the antenna array, wherein the second calibration group comprises at least the second antenna element and a third antenna element of the antenna array, and the second probe is dedicated for calibration and is disposed symmetrically between the second antenna element and the third antenna element, wherein the second probe is electrically connected to a second dedicated calibration transmitter different than transmitters that the second and third antenna elements are electrically connected to;

determining a second near-field amplitude relationship between at least the second antenna element and the third antenna element based on the signal transmitted from the second probe;

determining a second near-field phase relationship between at least the second antenna element and the third antenna element using the second probe; and storing the second near-field amplitude relationship and the second near-field phase relationship as calibration data for the antenna array.

2. The electronically-implemented method of claim 1, wherein the antenna array further comprises a fourth antenna element, wherein determining the first near-field amplitude relationship further comprises determining an amplitude relationship among the first antenna element, the second antenna element, the third antenna element and the fourth antenna element of the antenna array using the first probe, wherein the first probe is disposed symmetrically between the first antenna element, the second antenna element, the third antenna element, and the fourth antenna element, and wherein determining the first near-field phase relationship further comprises determining a phase relationship among the first antenna element, the second antenna element, the third antenna element, and the fourth antenna element using the first probe.

3. The electronically-implemented method of claim 1, further comprising deactivating antenna elements that are not included in a particular calibration group during calibration of that particular calibration group.

4. The electronically-implemented method of claim 1, wherein determining the first near-field phase relationship further comprises:

transmitting signals of a same amplitude from the transmitters of the first antenna element and the second antenna element; and phase shifting the signals relative to each other to identify in phase configurations.

5. The electronically-implemented method of claim 4, wherein the phase shifting is performed using a phase shifter, and wherein determining the first near-field phase relationship further comprises phase shifting the signals relative to each other to identify 180 degrees out of phase configurations.

6. The electronically-implemented method of claim 1, wherein monitoring the signal levels comprises amplitude measurement.

7. The electronically-implemented method of claim 1, wherein determining the first near-field amplitude relationship further comprises transmitting a radio frequency signal from the first probe and monitoring signal levels received at the first and second antenna elements.

8. The electronically-implemented method of claim 7, wherein determining the first near-field phase relationship further comprises:

receiving signals that are transmitted from the first probe, wherein the transmitted signals have a same amplitude; and phase shifting the received signals relative to each other to identify in phase configurations at the first and second antenna elements.

9. The electronically-implemented method of claim 1, further comprising adjusting transmitting power of the radio frequency signal from the transmitter of the first antenna element based on the monitoring the first signal levels received at the first probe.

10. The electronically-implemented method of claim 9, further comprising adjusting transmitting power of the radio frequency signal from the transmitter of the second antenna element based on the monitoring the second signal levels received at the first probe.

11. The electronically-implemented method of claim 1, wherein the first probe is connected with a first power detector and the second probe is connected with a second power detector.

12. The electronically-implemented method of claim 1, the method further comprising a phase calibration between the first antenna element and the second antenna element, the phase calibration comprising:

transmitting substantially same power levels from the first and second antenna elements;

measuring total power transmitted from the first and second antenna elements for phases of the first antenna element; and determining whether the measured total power corresponds to a maximum power, the maximum power determined based on the measuring the total power for the phases;

in response to determining that the measured total power corresponds to the maximum power, recording a phase associated with the first and second antenna elements.

13. An apparatus with built-in calibration components, the apparatus comprising:

a plurality of antenna elements of an antenna array;

a plurality of probes of the antenna array, wherein the probes are disposed symmetrically between groups of antenna elements of the plurality of antenna elements, wherein the groups comprise at least two antenna elements each, and at least two groups of antenna elements share at least one antenna element, wherein the probes are configured to wirelessly receive radio-frequency (RF) signals and each of the antenna elements are arranged to transmit RF signals to one or more of the probes for built-in near-field calibration of the antenna array, wherein the probes are dedicated for calibration and electrically connected to corresponding dedicated calibration transmitters, and wherein the antenna elements are electrically connected to transmitters different than the dedicated calibration transmitters; and a hardware processor of the antenna array configured to:

measure power for each of a plurality of phases of individual signal levels of first signal levels received at a first probe of the plurality of probes associated with an RF signal from a first transmitter of the transmitters of a first antenna element of the plurality of antenna elements with all other transmitters of the transmitters turned off;

measure power for each of a plurality of phases of individual signal levels of second signal levels received at a second probe of the plurality of probes associated with an RF from a second transmitter of the transmitters of a second antenna element of the plurality of antenna elements with all other transmitters of the transmitters turned off; and calibrate the antenna array by observations of near-field radiation obtained by using the plurality of probes based on the measured power of the plurality of phases of individual signal levels of the first and second signal levels.

14. The apparatus of claim 13 wherein the groups each comprise at least four antenna elements.

15. The apparatus of claim 13, wherein the hardware processor is further configured to adjust a variable gain amplifier of at least one antenna element to calibrate the antenna array.

16. The apparatus of claim 13, wherein the hardware processor is further configured to adjust a phase shifter of at least one antenna element to calibrate the antenna array.

17. The apparatus of claim 13, wherein the probes are configured to monitor signal levels of radio frequency signals transmitted from the antenna elements.

18. An electronically-implemented method of calibrating an antenna array, the electronically-implemented method comprising:

observing radiation patterns in near field measurements from at least signals transmitted wirelessly by groups of antenna elements to probes symmetrically disposed between the groups of antenna elements of the antenna array to obtain relative amplitude and phase relationships among the antenna elements of the array, wherein at least two of the groups of antenna elements share at least one antenna element, wherein the probes are dedicated for calibration and electrically connected to corresponding dedicated calibration transmitters, wherein the antenna elements are electrically connected to transmitters different than the dedicated calibration transmitters, and wherein the observing the radiation patterns includes measuring (a) power for each of a plurality of phases of individual signal levels of first signal levels received at a first probe of the probes associated with a first radio frequency signal from a first transmitter of the transmitters of a first antenna element of the antenna elements with all other transmitters of the transmitters turned off and (b) power for each of a plurality of phases of individual signal levels of second signal levels received at a second probe of the probes with a second radio frequency signal from a second transmitter of the transmitters of a second antenna element of the antenna elements with all other transmitters of the transmitters turned off;

generating amplitude and phase adjustments based at least in part on the obtained relative amplitude and phase relationships and on a desired antenna pattern; and applying the generated amplitude and phase adjustments to obtain the desired antenna pattern.

19. The electronically-implemented method of claim 18, further comprising repeating observing radiation patterns across a plurality of channels comprising different frequencies.

20. The electronically-implemented method of claim 18, wherein the antenna elements and the probes of the antenna array are disposed in a single or multiple array panels.

\* \* \* \* \*